(12) United States Patent
Jahnke et al.

(10) Patent No.: US 7,844,642 B2
(45) Date of Patent: Nov. 30, 2010

(54) METHOD AND STRUCTURE FOR STORING DATA OF AN XML-DOCUMENT IN A RELATIONAL DATABASE

(75) Inventors: Joerg Jahnke, Hamburg (DE); Dietmar Cordes, Horneburg (DE)

(73) Assignee: Oracle America, Inc., Redwood City, CA (US)

( * ) Notice: Subject to any disclaimer, the term of this patent is extended or adjusted under 35 U.S.C. 154(b) by 2007 days.

(21) Appl. No.: 10/054,544

(22) Filed: Jan. 18, 2002

(65) Prior Publication Data

US 2002/0099715 A1    Jul. 25, 2002

(30) Foreign Application Priority Data

Jan. 22, 2001    (EP)  ..................... 01101379

(51) Int. Cl.
G06F 12/00    (2006.01)
G06F 17/30    (2006.01)

(52) U.S. Cl. ..................................... 707/809
(58) Field of Classification Search ..... 707/100–103 R, 707/10, 201; 705/26
See application file for complete search history.

(56) References Cited

U.S. PATENT DOCUMENTS

| | | | |
|---|---|---|---|
| 6,625,581 B1 * | 9/2003 | Perkowski | 705/27 |
| 6,721,727 B2 * | 4/2004 | Chau et al. | 707/3 |
| 6,721,871 B2 * | 4/2004 | Piispanen et al. | 712/1 |
| 6,725,231 B2 * | 4/2004 | Hu et al. | 707/102 |
| 6,732,095 B1 * | 5/2004 | Warshavsky et al. | 707/5 |
| 6,732,109 B2 * | 5/2004 | Lindberg et al. | 707/101 |
| 2002/0107761 A1 * | 8/2002 | Kark et al. | 705/27 |

OTHER PUBLICATIONS

Mark Birbeck, "Re: Storing XML Documents in Relational Databases", XML Discussion List: General Discussion of Extensible Markup Language, Dec. 16, 1998, p. 1, XP002168316.

A. Deutsch, M. Fernandez, D. Suciu, "Storing Semistructured Data in Relations", ICDT '99 Workshop on Query Processing for Semistructured Data and Non-Standard Data Formats, Jan. 13, 1999, pp. 1-6, XP002168317.

(Continued)

Primary Examiner—Sathyanarayan Pannala
(74) Attorney, Agent, or Firm—Gunnison, McKay & Hodgson, L.L.P.; Forrest Gunnison

(57) ABSTRACT

A method for importing data from an XML document containing a plurality of elements and a plurality of attributes into a relational database includes: creating an element table for storing data of the plurality of elements and creating an attribute table for storing data of the plurality of attributes. In the element table, element records, each containing a unique element ID, are stored, one record for every one of the plurality of elements is stored. In the attribute table, an attribute record for every one of the plurality of attributes is stored. Each attribute record includes an attribute name, an attribute value and the element ID of the element to which the attribute is assigned. The method provides a fixed database model for different XML documents; allows a simple creation of a database; and allows simple data import and export into/from the database.

33 Claims, 11 Drawing Sheets

OTHER PUBLICATIONS

D. Florescu, D. Kossmann, "A Performance Evaluation of Alternative Schemes for Storing XML Data in a Relational Database", Inria Technical Report No. 3680, May 1999, pp. 1-31, XP002168318.

G. Kappel, E. Kapsammer, W. Retschitzegger, "X-Ray-Towards Integrating XML and Relational Database Systems", Technical Report Johannes Kepler University Linz, Jul. 2000, pp. 1-27, XP002168319.

J. Shanmugasundaram, et al., "Relational Databases for Querying XML Documents: Limitations and Opportunities", Proceedings of the 25th International Conference on Very Large Databases, Edinburgh, UK, Sep. 7-10, 1999, Morgan Kaufman Publishers, pp. 302-314, XP002168320.

Norman Walsh, "What Do XML Documents Look Like", Oct. 3, 1998 O'Reilly & Associates, Inc., 2001, pp. 1-12.

W3C XML Working Group, Extensible Markup Language (XML) 1.0, 2000, W3C, pp. 1-51.

Erik T. Ray, "Learning XML (Guide to) Creating Self-Describing Data", Chapter 2: Markup and Core Concepts, Jan. 2001, O'Reilly & Associates, Inc., pp. 1-36.

Ronald Bourret, "XML Database Products", 2000, 4 pages total.

"XMLdb: Build Database tables to feed your XML", 1998-2000, Cerium Component Software, 2 pages total.

Brad Wait, "Using XML in Oracle Database Applications: Part 2: About Oracle XML Products", Nov. 1999, Oracle Corporation, 15 pages total.

Ronald Bourret, "XML and Databases", 1999-2000, 10 pages total.

Bert Bos, XML in 10 Points (7, really . . . ), 1999-2000, W3C, 2 pages total.

Raminvas Laddad, "XML APIs for Databases", 2000, ITworld.com, Inc., 11 pages total.

* cited by examiner

Fig. 2
(Prior Art)

Element

[39] element  ::=  EmptyElemTag | STag content Etag    [WFC: Element Type Match]
                                                       [VC: Element Valid]

Start-tag

[40] STag      ::=  '<' Name (S Attribute)* S? '>'     [WFC: Unique Att Spec]
[41] Attribute ::=  Name Eq AttValue                   [VC: Attribute Value Type]
                                                       [WFC: No External Entity Reference]
                                                       [WFC: No < in Attribute Values]

End-tag

[42] ETag      ::=  '</' Name S? '>'

Content of Elements

[43] content   ::=  CharData? ((element | Reference | CDSect | PI | Comment) CharData?) *

Tags for Empty Elements

[44] EmptyElemTag  ::=  '<' Name (S Attribute)* S? '/>'    [WFC: Unique Att Spec]

METHOD AND STRUCTURE FOR STORING DATA OF AN XML-DOCUMENT IN A RELATIONAL DATABASE

BACKGROUND OF THE INVENTION

1. Field of the Invention

The present invention relates generally to XML-documents, and more particularly to a method and an apparatus for storing data of an XML-document in a relational database and to the resultant data structure.

2. Description of Related Art

Within a short time after standardization of the eXtended Markup Language (XML), XML has become increasingly popular among software developers, and in particular, among software developers for world-wide-web applications. XML appears on the way to becoming a worldwide standard for the creation of a structured web-based document.

XML is regarded as a meta-language for describing markup languages. XML provides facilities to define tags and structural relationships between the tags. XML is a platform independent set of rules for putting structured data into a file. With XML, the content data may be separated from the presentation or formatting information.

XML-documents are increasingly used for the exchange of data between different database servers, for example in electronic commerce applications. In this case, when XML-document files are used for data exchange between two database servers or when queries are made on large XML-documents, the XML-document files have to be imported into a database. While some database management systems are said to be "XML enabled," storing XML-documents in any relational database system is problematic.

Databases and XML-document files offer complementary functionality for storing data. Databases store data for efficient retrieval, whereas XML-document files offer an easy information exchange that enables interoperability between applications.

SUMMARY OF THE INVENTION

In one embodiment of the present invention, data characterizing each element of a markup document and data characterizing each attribute of a markup document are extracted from the markup document and stored in a relational database. A fixed database model is used for storing this data in the relational database.

In this fixed database model, one database table is created for storing the data characterizing the elements of the markup document and another database table is created for storing the data characterizing the attributes. These database tables are memory data structures that are configured to store records, as described below. Formatting information and the like is not stored in the relational database. Only the content information is extracted from the markup document and stored in the relational database. The database creation, therefore, is greatly simplified since one database model, once created, can be used for all markup documents including XML-documents.

Also, data import is simplified since a standard XML parser can be used to extract the elements and attributes from an XML-document. The retrieval of data from the relational database for creating a new XML-document is also simple since all necessary content information can be easily extracted from the two tables.

In one embodiment of the present invention, a computer-based method stores data, from a markup document containing a plurality of elements and a plurality of attributes, in a relational database. The method stores an element record for every element of the plurality of elements in an element table of the relational database. Each element record includes a unique element ID that is stored in an element ID field, and an element data set stored in at least one field.

This method also stores an attribute record for every attribute of the plurality of attributes in an attribute table of the relational database. The attribute record includes an attribute data set, stored in at least one field, for one attribute and an element ID, stored in an element ID field, of an element to which the one attribute is assigned.

In one embodiment, the element data set contains the character data in the element. This character data is stored in a character data field of the record. In another embodiment, the element data set includes a character data ID stored in a character data ID field. The character data is stored in a character data record in a character data table along with a corresponding unique character data ID.

To reflect the hierarchical structure of the elements of the XML-document, the element data set also includes an ID of a parent element of the XML element, if such parent element exists. This parent ID is stored in a parent ID field of the element data set.

To facilitate sorting operations or the like, an additional element number is assigned to the element. This element number is stored in the respective element data set.

In one embodiment, the element data set contains the element name from the XML-document. In another embodiment, the element data set contains an element name ID. In this another embodiment, the method stores, for every unique element name of the plurality of elements, an element name record including an element name and a corresponding unique element name ID in an element name table of the relational database. If the XML-document contains a large number of elements having the same name, this embodiment can achieve a substantial reduction of the necessary memory space for the relational database.

In a similar way according to yet a further embodiment, an attribute name table is created containing every unique attribute name appearing in the XML-document and a corresponding unique attribute name ID for each attribute name. In this embodiment, the attribute data set contains only the attribute name ID instead of the full attribute name.

A memory data structure, according to one embodiment of the present invention, includes an element table and an attribute table. The element table is configured to store a plurality of element records corresponding to a plurality of elements of a markup document. Each element record includes an assigned element ID field, and an element data set field. The attribute table is configured to store a plurality of attribute records corresponding to a plurality of attributes of the markup document. Each attribute data record includes an element ID field and an attribute data set.

In another embodiment, the memory data structure further includes an element name table. The element name table is configured to store a plurality of element name records. Each element name record includes an element name ID field and a corresponding element name field. The memory data structure also may include an attribute name table. The attribute name table is configured to store a plurality of attribute name records. Each attribute name record includes an attribute name ID field and a corresponding attribute name field.

A computer program product, in one embodiment of this invention, has stored thereon a module for transferring data from a markup document into a relational database. Execution of the module generates a method comprising:

storing an element record for every element of a plurality of elements of the markup document in an element table of the relational database, wherein each element record includes a unique element ID, and an element data set; and storing an attribute record for every attribute of a plurality of attributes of the markup document in an attribute table of the relational database, wherein the attribute record comprises an attribute data set for one attribute and an element ID of an element to which the one attribute is assigned.

In yet another embodiment, the method resulting from execution of the module also includes storing, for every unique element name of the plurality of elements, an element name record including an element name and a corresponding unique element name ID in an element name table of the relational database. The method further includes storing, for every unique attribute name of the plurality of attributes, an attribute name record including an attribute name and a corresponding unique attribute name ID in an attribute name table of the relational database.

A computer system, in one embodiment of this invention, includes a memory having stored therein a module for transferring data from a markup document into a relational database. A processor coupled to the memory executes the module to generate a method comprising:

storing an element record for every element of a plurality of elements of the markup document in an element table of the relational database, wherein each element record includes a unique element ID, and an element data set; and storing an attribute record for every attribute of a plurality of attributes of the markup document in an attribute table of the relational database, wherein the attribute record comprises an attribute data set for one attribute and an element ID of an element to which the one attribute is assigned.

With these embodiments of present invention, the content information of an XML-document is transferred quickly and efficiently into a relational database where search and query operations can be performed much better than on the basis of the XML-document itself.

BRIEF DESCRIPTION OF THE DRAWINGS

FIG. 2 is a listing of prior art definitions of features and characteristics of XML-elements and attributes.

In the Figures and the following detailed description, features with the same reference numeral are the same or equivalent features. Also, the first digit of a reference numeral indicates the figure in which the corresponding feature first appeared.

DETAILED DESCRIPTION

Figure 1A:
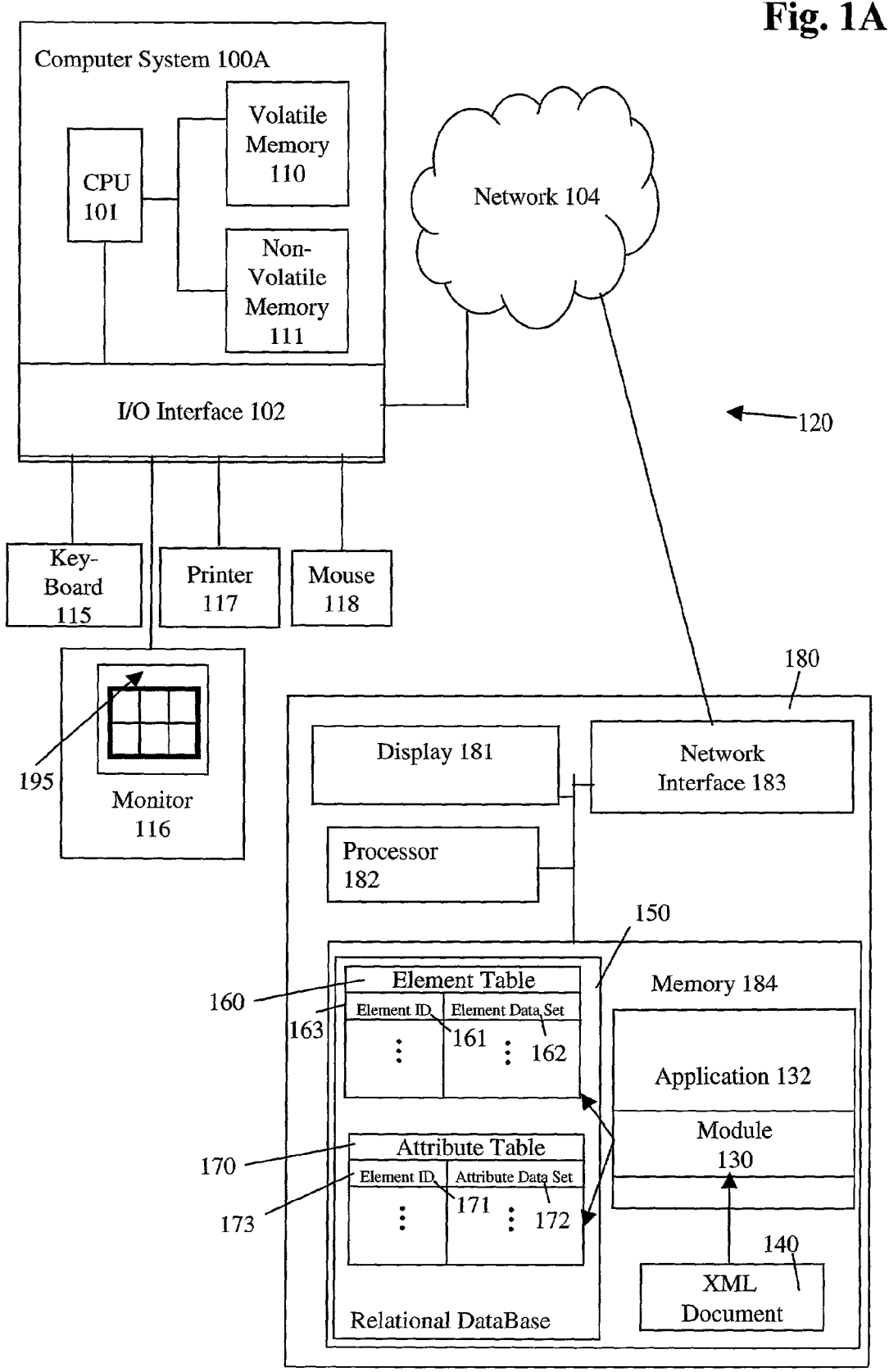
FIG. 1A is a diagram of a client-server system that includes a module for converting an XML-document into a relational database according to an embodiment of the present invention.

According to one embodiment of the present invention, as illustrated in FIG. 1A, a module 130 of an application 132 executing on a server system 180 of a client-server system 120 transforms an XML-document 140 into a relational database 150. As explained more completely below, in this embodiment, relational database 150 includes two tables, namely an element table 160 and an attribute table 170, which represent the content of XML-document 140.

For every element of XML-document 140, module 130 creates an element record 163 in element table 160. Element record 163 includes an element identification (ID) field 161 and a corresponding element data set 162. Element ID field 161 contains a unique element identifier for the element in XML-document 140 represented by element record 163. In one embodiment, element data set 162 includes an element name field and a character data field that contain the corresponding data for the element, i.e., the element name and character data, respectively.

For every attribute contained in XML-document 140 an attribute record 173, corresponding to one line of attribute table 170, is created by module 130. In this embodiment, attribute record 173 includes an element ID field 171 and an attribute data set 172. Element ID field 171 contains the element ID of the element in which the attribute appears. Attribute data set 172 includes an attribute name of the attribute and an attribute value of the attribute, in one embodiment.

Formatting information and the like contained in XML-document 140 are not stored in database 150. Only the content information, as defined by the elements and attributes in XML-document 140, is extracted from XML-document 140 and stored in relational database 150.

Hence, creation of database 150 is simplified greatly, because one database model, once created, can be used for all XML-documents. Also, data import in relational database 150 is simplified because module 130 simply needs to include a standard XML parser to extract the elements and attributes from XML-document 140. The retrieval of data from database 150 for creating a new XML-document is also simple since all necessary content information is easily extracted from tables 160 and 170.

Elements, referred to above in XML-document 140 and in database 150, have a specific definition that is given in Extensible Markup Language (XML) 1.0 (Second Edition), W3C Recommendation Oct. 6, 2000, which is incorporated herein by reference in its entirety to demonstrate the knowledge of those of skill in the art. FIG. 2 presents pertinent parts of the definition of elements, as used herein.

As illustrated in FIG. 2, XML-document 140 contains one or more elements [39], as defined in FIG. 2. The boundaries of an element are delimited by a start-tag STag [40] and an end-tag Etag [42], or for an empty element, by an empty-element tag EmptyElemTag [44].

Each element has a type that is identified by name, and may have a set of attribute specifications. Each attribute specification has an attribute name and an attribute value. Text between a start-tag STag [40] and an end-tag Etag [42] is the content of the element.

Start-tag STag [40] includes a name that gives the type of the element. Following the name in the start tag is the set of attribute specifications associated with the element. Each attribute specification includes a name-attribute value pair. The name in each pair is referred to as the attribute name, while the value of the pair, i.e., the content between either single quote or double quote delimiters, is the attribute value.

XML elements including (i) the attributes including the corresponding attribute values and (ii) the character data contents form the most important part of the content of the XML-document. Thus, according to this embodiment of the present invention, only this content is stored in database 150 whereas formatting information or the like is discarded.

In FIG. 1A, application 132 and module 130 are stored in a memory 184 of server system 180 and executed on server 180 that is coupled to client computer system 100A by network 104. The particular type of and configuration of client computer system 100A is not essential to this embodiment of the present invention. The only requirement is that the client device be able to display the information described herein, and to issue input commands, as described herein. Similarly, network 104 can be any network or network system that is of interest to a user that couples client computer system 100A to server system 180.

Similarly, the method used to store and retrieve the data and/or data sets for the elements is illustrative only and is not intended to limit the invention to the particular embodiments described herein. Finally, module 130 is illustrated as being a part of application 132 in FIGS. 1A and 1B. Again, this is illustrative only. Module 130 should be capable of being called from application 132. Moreover, those of skill in the art will understand that when it is said that a module or an operation takes some action, the action is the result of executing one or more instructions by a processor.

Figure 1B:
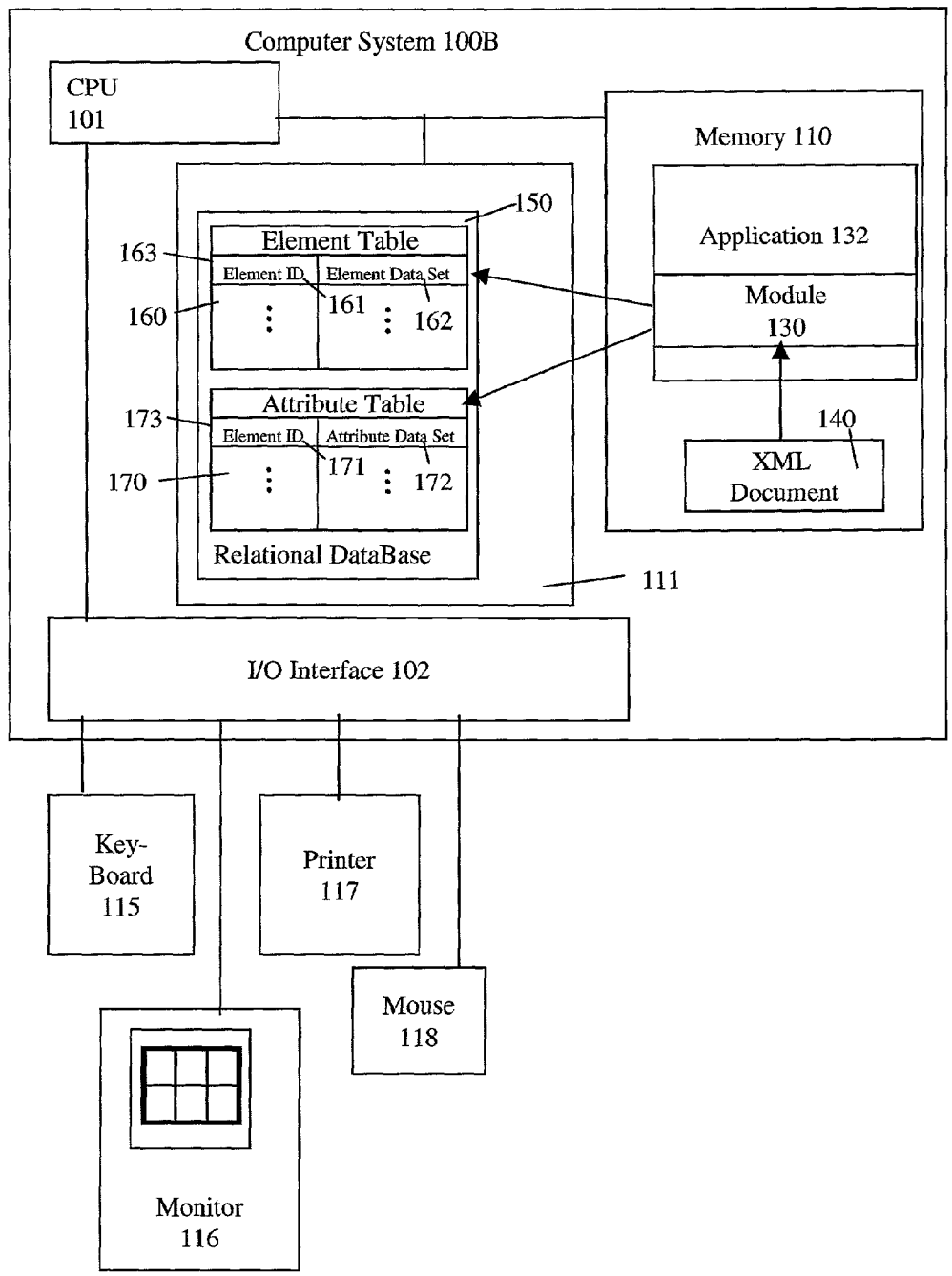
FIG. 1B is a diagram of a standalone system that includes a module for converting an XML-document into a relational database according to an embodiment of the present invention.

FIG. 1B is an example of one embodiment of the present invention implemented in a stand-alone computer system 100B. The above comments with respect to FIG. 1A being illustrative only are directly applicable to FIG. 1B and are incorporated herein by reference. As is known to those of skill in the art, only a part of XML-document 140 may be in memory 110 with the rest in memory 111. Similarly, only module 130 or a part of module 130 may be contained in memory 110 with the rest in memory 111 at a given point in time.

Computer system 100A and computer system 100B may comprise a central processing unit 101, an input output (I/O) unit 102, a volatile memory 110 and a non-volatile memory 111. Systems 110A and 110B may further include standard input devices like a keyboard 115, a mouse 118, a printer 117, a display device 116, or a speech processing means (not illustrated).

Figure 3:
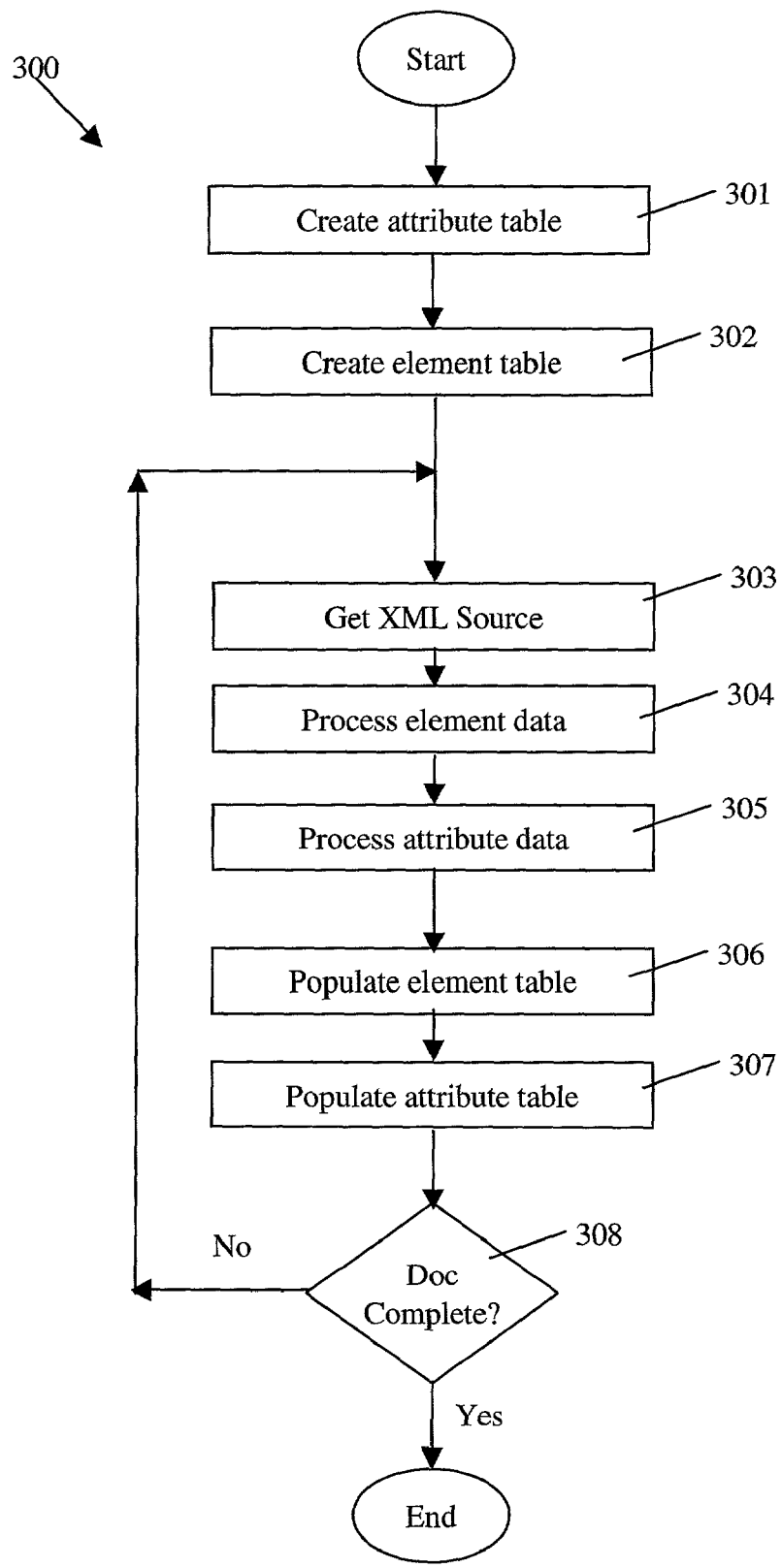
FIG. 3 is a process flow diagram of a method, according to one embodiment of the present invention, for converting an XML-document into a relational database.

FIG. 3 is a process flow diagram for one embodiment of a process 300 that results from the execution of computer program instructions of module 130. Create attribute table operation 301 creates attribute table 170 and transfers processing to create element table operation 302 that in turn creates element table 160. The instructions required to implement operations 301 and 302 depends upon, for example, the particular database system being used and the storage capacity in the system.

One important aspect is that an element table memory data structure is created in operation 301 that can store a plurality of element records, as described more completely below. Similarly, an attribute table memory data structure is created that can store a plurality of attribute records, as described more completely below. Hence, it is said that these tables are each configured to store a plurality of records. Notice that these table structures are created without regard to the specific content of XML-document 140. Operation 302 transfers to get XML source operation 303.

Typically, a user specifies either the storage location of XML-document 140, or a unique identifier for XML-document 140. Get XML source operation 303 uses this information to access XML-document 140 and to input XML-document 140.

Again, implementation of get XML source operation 303 depends on the system configuration and processing capability. For example, if storage capacity is limited on the system executing process 300, XML-document 140 may be accessed from a remote storage location. Alternatively, XML-document 140 may be stored in a local memory or moved to a local memory for processing. Get XML source operation 303 needs to be able to access XML-document 140 and input XML-document 140, or a portion of XML-document 140 for processing by the subsequent operations in process 300.

In process element data operation 304, an element record 163 is generated for every element of XML-document 140, or of the portion of XML-document 140 provided by operation 303. In this embodiment, each element record 163 includes an element ID field 161 and an element data set 162. Element ID field 161 contains a unique assigned element ID. Element data set 162 contains, for example, the element name and character data. In one embodiment, element data set 162 also includes a parent ID field that contains the element ID of the parent element. Process element data operation 304, upon completion, transfers processing to process attribute data operation 305.

In process attribute data operation 305, an attribute record 173 is generated for every attribute of XML-document 140 or the portion of XML-document 140 provided by operation 303. In this embodiment, each attribute record 173 includes an attribute data set 172 and an element ID field 171 that contains the element ID of the element in which the attribute is located. In one embodiment, attribute data set 172 includes an attribute name field and an attribute value field that store the attribute name and the attribute value, respectively. Process attribute data operation 305, upon completion, transfers processing to populate element table operation 306.

Populate element table operation 306 stores each of the element records generated in operation 304 in the element table created in operation 302. Operation 306 transfers processing to populate attribute table operation 307.

Populate attribute table operation 307 stores each of the attribute records generated in operation 305 in the attribute table created in operation 301. Operation 307 transfers document complete check operation 308.

If the entire XML-document was retrieved in get XML source operation 303, processing of XML document 140 is complete and so check operation 308 transfers to end operation. Conversely, if only a portion of XML document 140 was retrieved in get XML source operation 303, check operation 308 returns to operation 303. In this case, operations 303 to 307 are repeated for the next portion of XML-document 140. Hence, when check operation 308 transfers to the end operation, the data transfer of only the elements and attributes from XML-document 140 into relational database 150 is finished.

Figure 4:
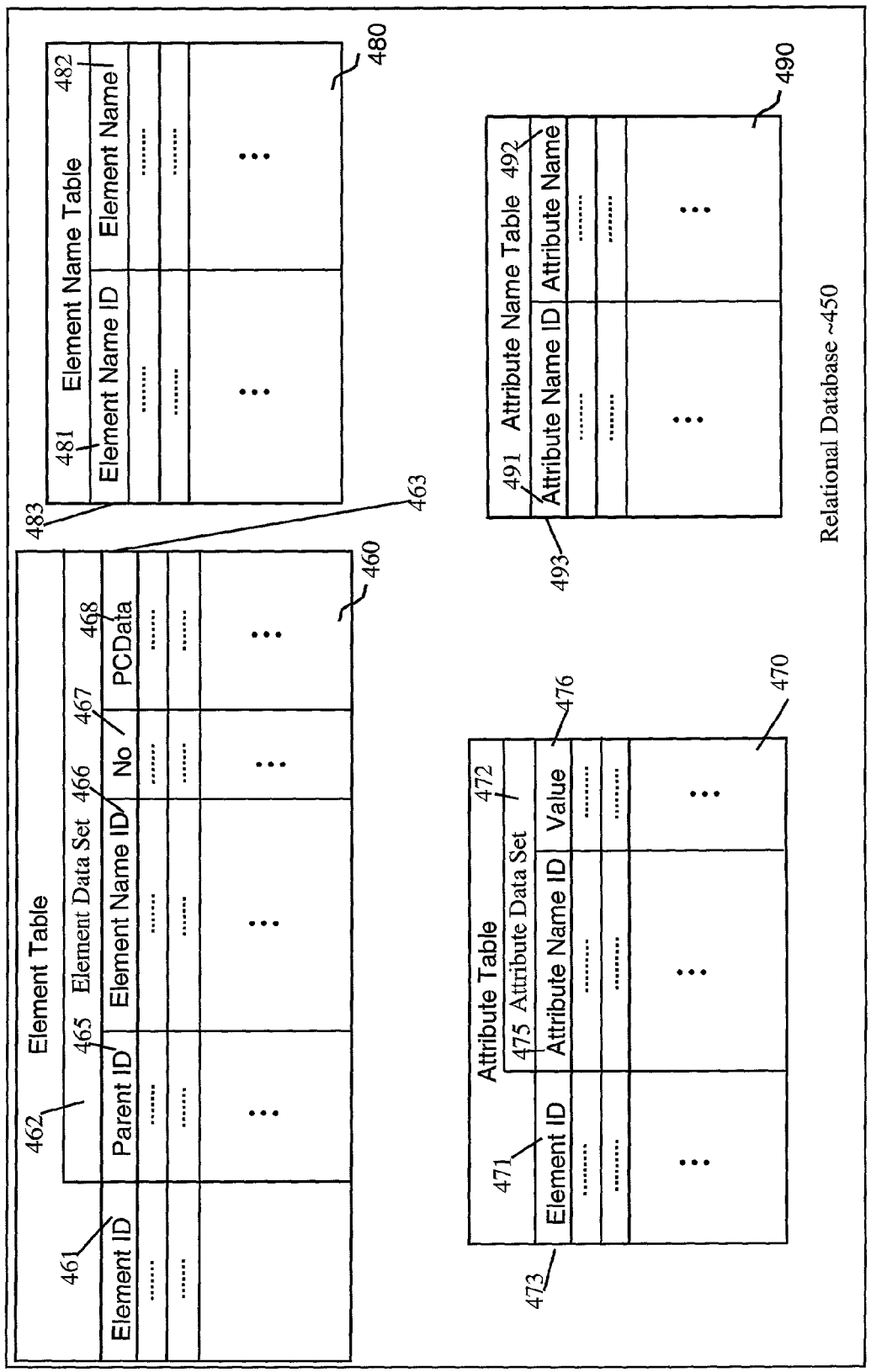
FIG. 4 is an illustration of a relational database memory data structure that includes a plurality of tables representing data in an XML-document, according to one embodiment of the present invention.

According to a further embodiment of the present invention, module 130 generates tables in addition to tables 160 and 170 (FIGS. 1A and 1B). In the embodiment of FIG. 4, in addition to element table 460 and attribute table 470, relational database 450 includes an element name table 480 and an attribute name table 490.

In this embodiment, each element record 463 of element table 460 contains an element ID field 461 and an element data set 462. Again, element ID field 461 stores a unique identifier for the element represented by element record 463. Element data set 462 includes a parent ID field 465, an element name ID field 466, a sort number field 467, and a character data field PCDATA 468.

If an element has a parent element, the element ID of this parent element is entered in parent ID field 465 and otherwise parent ID field 465 is blank. An element name ID 481 from element name table 480 corresponding to element name 482 of the element is entered in element name ID field 466. Sort number field 467 contains an element number for facilitating sorting operations. Character data appearing in the element is stored in character data field PCDATA 468.

Element name table 480 includes an element name record 483 for every unique element name appearing in XML-document 140. Each element name record 483 includes an element name ID field 483 that contains a unique element name ID and a corresponding element name field 482 that contains the corresponding element name. Hence, element name table 480 forms a lookup table for the element name on the basis of the element name ID. This is advantageous and saves memory space if XML-document 140 contains a large number of elements having the same, and probably long, name.

In this embodiment, each attribute record 473 of attribute table 470 contains an element ID field 471 and an attribute data set 472. Attribute data set 472 includes an attribute name ID field 475 and an attribute value field 476.

Again, element ID field 471 contains the element ID of the element in which the attribute appears. An attribute name ID from attribute name table 490 corresponding to the attribute name of the attribute is entered in attribute name ID field 475. Attribute value field 476 contains an attribute value of the attribute. Herein, for convenience, the same reference number is used for a field and the value stored in that field of the database.

Attribute name table 490 includes an attribute name record 493 for every unique attribute name appearing in XML-document 140. Each attribute name record 493 includes an attribute name ID field 491 that contains a unique attribute name ID and a corresponding attribute name field 492 that contains the corresponding attribute name. Hence, attribute name table 490 forms a lookup table for the attribute name on the basis of the attribute name ID. This is advantageous and saves memory space if XML-document 140 contains a large number of attributes having the same, and probably long, name.

Figure 5A:
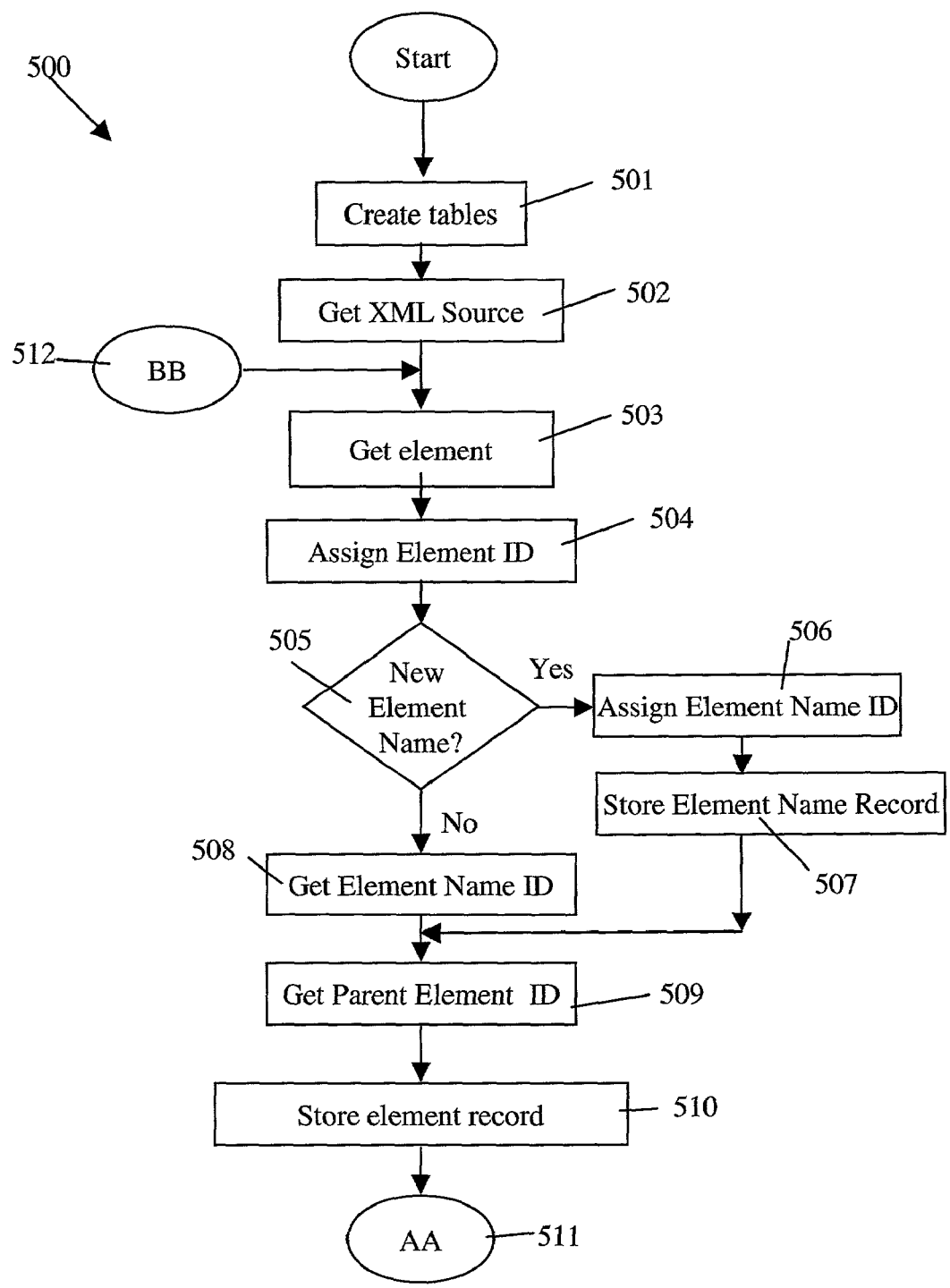
FIGS. 5A and 5B are a process flow diagram of a method, according to one embodiment of the present invention, for converting an XML-document into a relational database as illustrated in FIGS. 4 and 8.
Figure 5B:
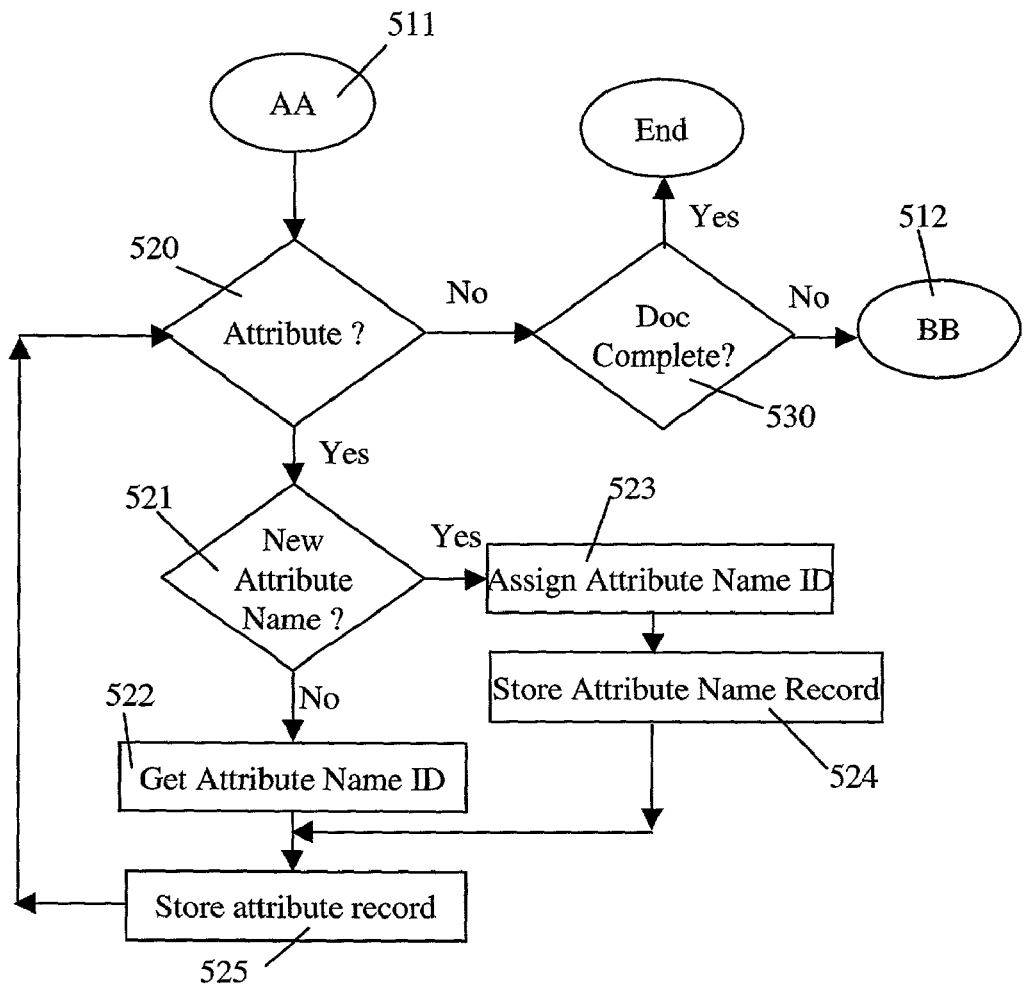

FIGS. 5A and 5B are a process flow diagram for a method 500 that results from execution of an alternative embodiment of module 130, and that generates a relational database, such as database 450, from XML-document 140. Upon starting process 500, in this embodiment, an element table 460, an element name table 480, an attribute table 470 and an attribute name table 490 are created in a memory of the system by create tables operation 501. Hence, a memory data structure is created that includes a plurality of tables for storing the information content of XML-document 140, as explained more completely below. Operation 501 transfers to get XML source operation 502.

Get XML source operation 502 retrieves XML-document 140 for processing. As described above, XML-document 140 is parsed, in one embodiment, using a standard XML-parser. When an element is detected in the parsing, get element operation 503 retrieves the element, which is referred to below as the current element, for further processing and transfers to assign element ID operation 504.

A unique element ID is assigned to the current element in assign element ID operation 504. Operation 504 transfers processing to new element name check operation 505.

New element name check operation 505 determines whether the name of the current element is included in element name table 480. If the name of the current element is not in element name table 480, the element name is new and processing transfers to assign element name ID operation 506, and otherwise to get element name ID operation 508.

Assign element name ID operation 506 assigns, in this embodiment, the number of the next empty record in element name table 480 as the element name ID for the new element name and transfers to store element name record operation 507. Operation 507, in turn, stores the element name ID and the new element name in fields 481 and 482, respectively, as the next element name record in element name table 480. Operation 507 transfers to get parent element ID operation 509.

If the name of the current element was not new, check operation 505 transferred to get element name ID operation 508. If the name of the current element is not new, the element name is included in element name table 480 and operation 508 gets the element name ID corresponding to the element name. Operation 508 transfers processing to get parent element ID operation 509.

If the current element is not a child element, operation 509 simply passes through to store element record operation 510. However, if the current element is a child element, operation 510 gets the element ID for the parent element, which is the parent element ID, and then transfers to store element record operation 510.

Store element record operation 510 stores an element record in element table 460 for the current element. The element record includes: the element ID assigned in operation 504; an element name ID; a parent element ID if the current element is a child element; and character data, if present in the current element. Store element record operation 510 (FIG. 5A) passes processing, through node 511, to attribute check operation 520 (FIG. 5B).

If the current element contains one or more attributes, attribute check operation 520 transfers to new attribute name check operation 521 and otherwise to document complete check operation 530. Assuming the current element attribute contains at least one attribute, the first attribute is identified as the current attribute.

New attribute name check operation 521 determines whether the name of the current attribute is contained in attribute name table 490. If the name of the current attribute is contained in table 490, i.e., the attribute name is not new, check operation 521 transfers to get attribute name ID operation 522 and otherwise to assign attribute name ID operation 523.

Assuming the name of the current attribute is new, assign attribute name ID operation 523 assigns a unique attribute name ID to the new attribute name. Operation 523 transfers to store attribute name record operation 524.

Store attribute name record operation 524 stores the attribute name ID and the new attribute name in fields 491 and 492, respectively, as the next attribute name record in attribute name table 490. Operation 524 transfers processing to store attribute record operation 525.

If the name of the current attribute was not new, check operation 521 transferred to get attribute name ID operation 522. If the name of the current attribute is not new, the attribute name is included in attribute name table 490 and operation 522 gets the attribute name ID corresponding to the attribute name. Operation 522 transfers processing to store attribute record operation 525.

Store attribute record operation 525 stores an attribute record in attribute table 470 for the current element. The attribute record includes: the element ID assigned in operation 504 for the current element; an attribute name ID; and the value of the current attribute. Store attribute record operation 525 (FIG. 5B) returns processing to attribute check operation 520.

If the current element contains more than one attribute, the next attribute is identified as the current attribute and operations 521 to 525 are repeated, as appropriate, for the current attribute. When all the attributes of the current element have been processed, check operation 520 transfers to document complete check operation 530.

If the end of XML-document 140 has been reached, document complete operation 530 transfers to an end operation, and otherwise transfers processing, through node 512 (FIG. 5B), to get element operation 503 (FIG. 5A) that gets the next element in XML-document 140 for processing. Hence, when check operation 530 transfers to the end operation, each element and each attribute in XML-document has been imported into relational database 450.

The sequential flow of the operations in FIG. 3 and in FIGS. 5A and 5B is illustrative only and is not intended to limit the invention to the specific flow illustrated. As is known to those of skill in the art, the operation flow depends on not only the capabilities of the processor or processors executing module 130, but also the I/O and memory capabilities of the system. For example, the processes illustrated might be implemented in a multi-threaded environment, or in an environment where records are written into a buffer and then when the buffer is full, the stored records are burst to database 450. In either of these cases, the sequence of operations illustrated would be modified to support the particular environment.

Figure 6:
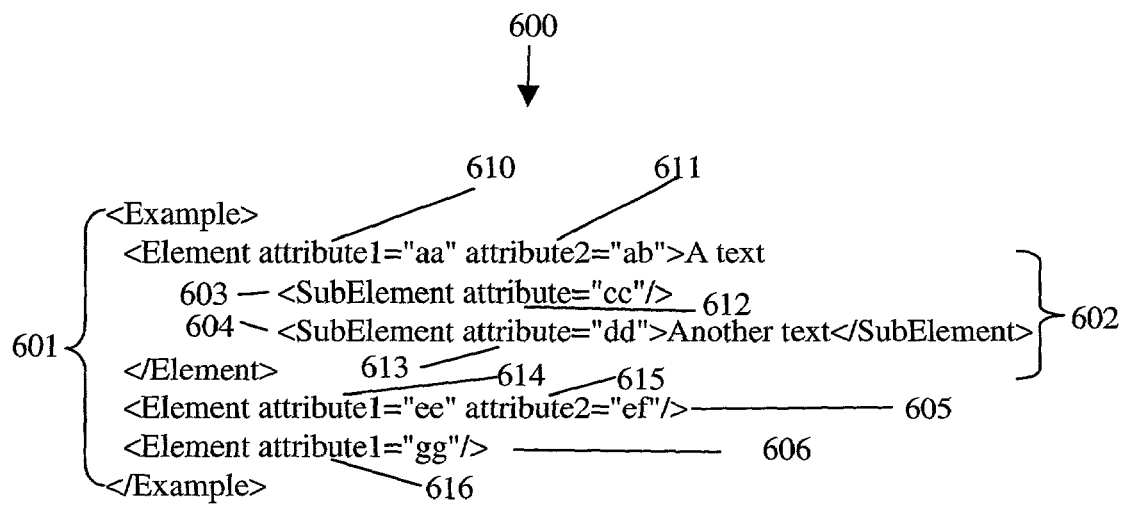
FIG. 6 is an example of a portion of an XML-document that is transformed into a relational database, according to various embodiments of the present invention.

To further demonstrate the features of one embodiment of this invention, the conversion of a portion 600 (FIG. 6) of a markup document is considered. In this example, the document includes six elements: (1) Example 601; (2) Element 602; (3) SubElement 603; (4) SubElement 604; (5) Element 605; and (6) Element 606.

Element Example 601 contains the other five elements. Specifically, element Example 601 is the parent element for elements Element 602, Element 605 and Element 606.

Element Element 602 includes attribute attribute1 610 and attribute attribute2 611 as well as character data "A text." Element Element 602 is a parent element for elements SubElement 603 and SubElement 604.

Element SubElement 603 is an empty element that includes an attribute attribute 612. Element SubElement 604 includes an attribute attribute 613 and character data "Another text."

Element Element 605 is an empty element that includes attribute attribute1 614 and attribute attribute2 615. Element Element 606 is another empty element that includes attribute attribute1 616. Hence, portion 600 of this markup document contains in total six elements, seven attributes, and two text portions.

Figure 7:
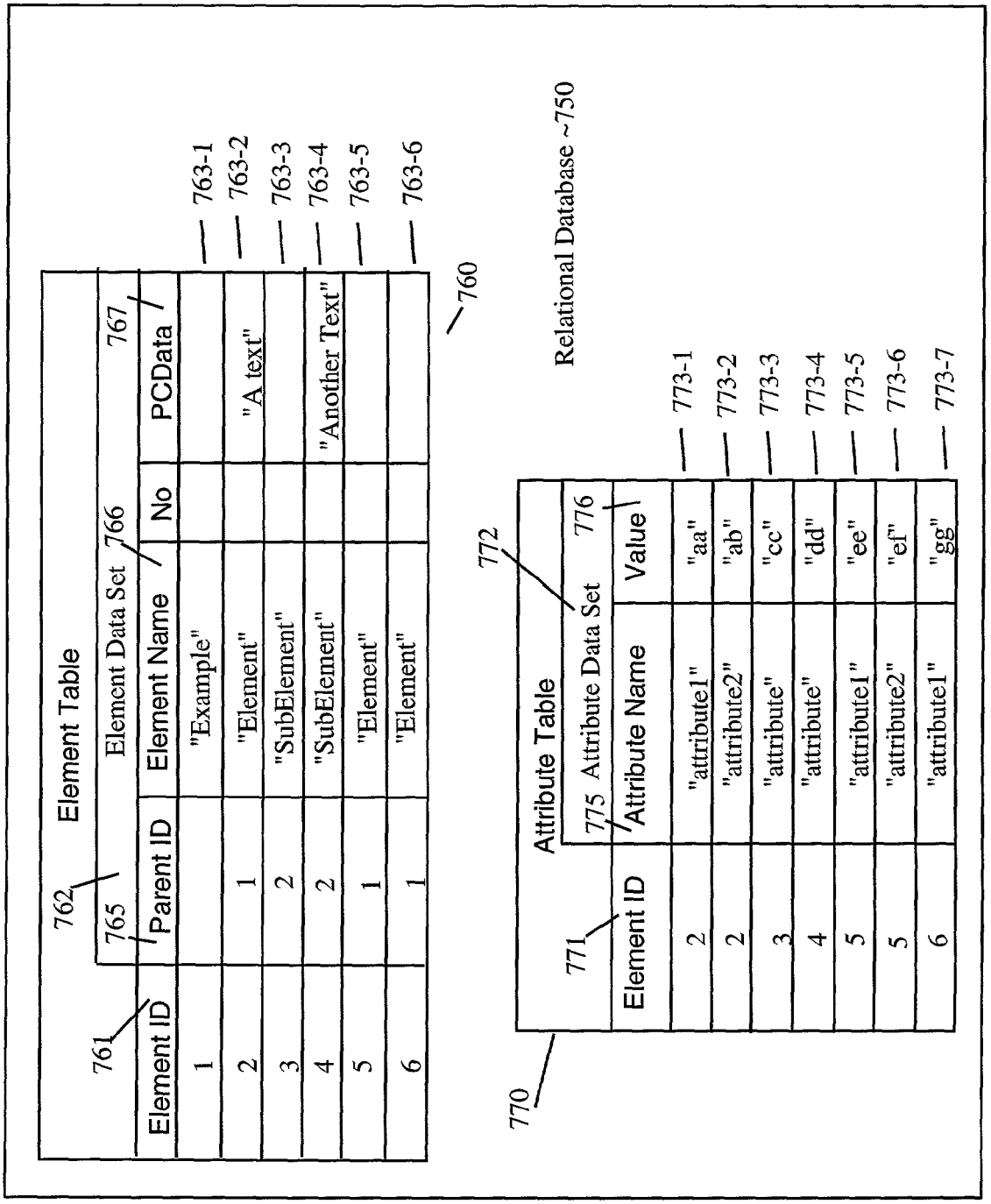
FIG. 7 is a diagram of a memory data structure, according to one embodiment of this invention, which includes a relational database including an element table and an attribute table for the XML-document of FIG. 6.

According to one embodiment of the present invention, when portion 600 of the markup document is processed, the elements and attributes of portion 600 are stored in a relational database 750 as illustrated in FIG. 7. In this example, relational database 750 includes an element table 760 that includes a plurality of element records 763_1 to 763_6, one for each of six elements 601 to 606, respectively. Relational database 750 also includes an attribute table 770 that includes a plurality of attribute records 773_1 to 773_7, one for each of seven attributes 610 to 616, respectively.

Each of element records 763_1 to 763_6 in table 760 includes an element ID in element ID field 761, and an element data set 762. In this embodiment, each element data set 762 includes a parent ID field 765, an element name field 766, and a character data field 767.

Each of attribute records 773_1 to 773_7 in table 770 includes an element ID in element ID field 771, and an attribute data set 772. In this embodiment, each attribute data set 772 includes an attribute name field 775, and an attribute value field 776. In view of the above description, each of the values in tables 760 and 770 follow from the information in FIG. 6, as described above.

Notice that in table 760, element name Element is repeated three times and element name SubElement is repeated twice. There are only three unique element names for six elements 601 to 606. Similarly, in attribute table 770, attribute name attribute1 is repeated three times, and each of the other attribute names is repeated twice. There are only three unique attribute names for seven attributes 610 to 616.

Hence, in another embodiment, process 500 (FIGS. 5A and 5B) is used for portion 600 (FIG. 6) to generate relational database 850. In this example, relational database 850 includes an element table 860 that includes a plurality of element records, one for each of six elements 601 to 606, respectively; an attribute table 870 that includes a plurality of attribute records, one for each of seven attributes 610 to 616, respectively; an element name table 880 that includes a plurality of element name records, one for each unique element name; and an attribute name table 890 that also includes a plurality of attribute name records, one for each unique attribute name.

Each element record in table 860 includes a unique element ID in element ID field 861, and an element data set 862. In this embodiment, each element data set 862 includes a parent ID field 865, an element name ID field 866, and a character data field 867 that each includes the corresponding data from portion 600.

Each element name record in table 880 includes a unique element name ID in element ID field 881, and a corresponding element name in element name field 882. In this embodiment, since there are three unique element names, table 880 includes three element name records, one for each unique element name.

Each attribute record in table 870 includes an element ID in element ID field 871, and an attribute data set 872. In this embodiment, each attribute data set 872 includes an attribute name ID field 875, and an attribute value field 876 that each includes the corresponding data from portion 600.

Each attribute name record in table 890 includes a unique attribute name ID in attribute name ID field 891, and a corresponding attribute name in attribute name field 892. In this embodiment, since there are three unique attribute names, table 890 includes three attribute name records, one for each unique attribute name. In view of the above description of process 500, each of the values in tables 860, 880, 870, and 890 follow from the information in FIG. 6, as described above.

Figure 8:
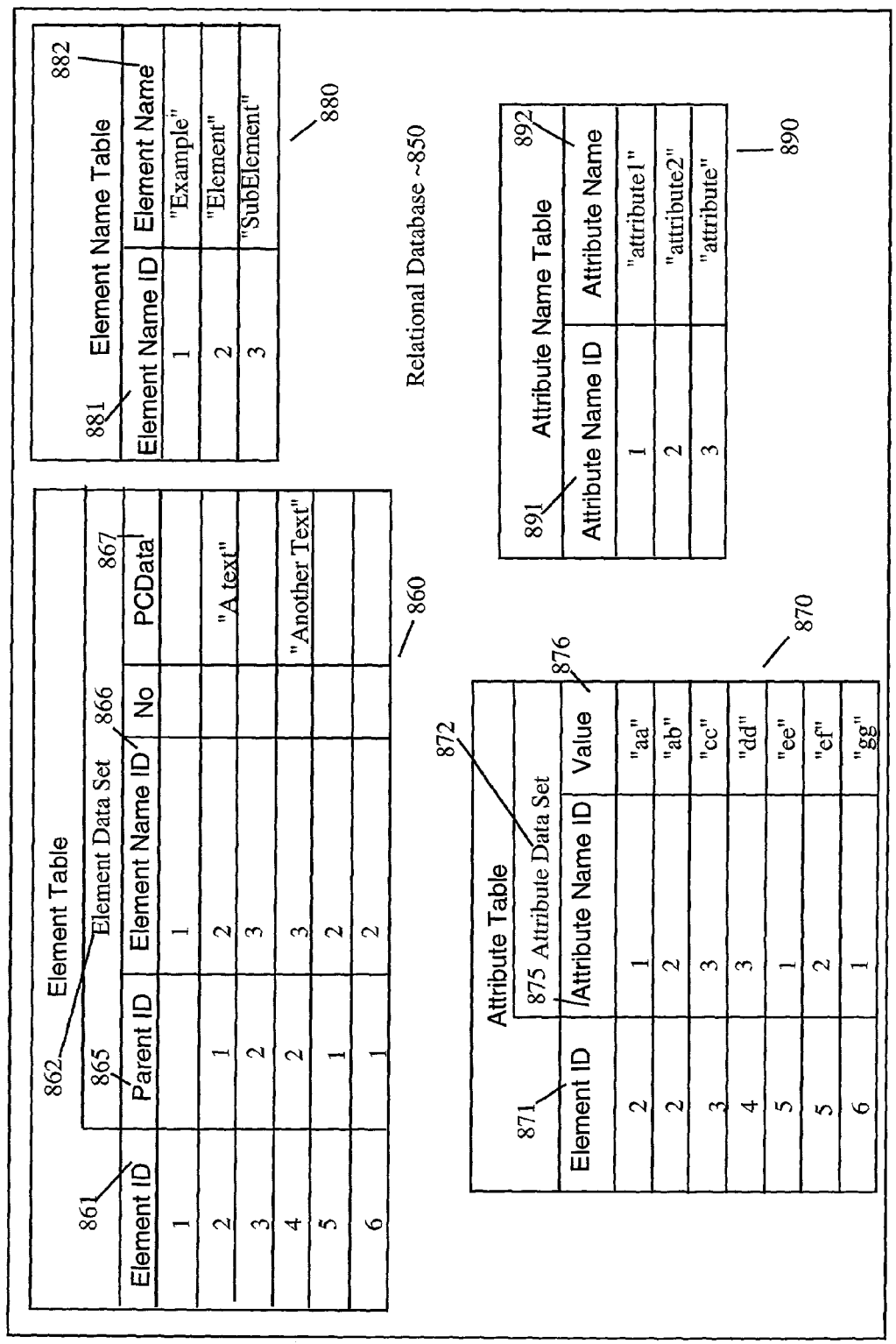
FIG. 8 is a diagram of a memory data structure, according to one embodiment of this invention, which includes a relational database including an element table, an element name table, an attribute table, and an attribute name table for the XML-document of FIG. 6.
Figure 9:
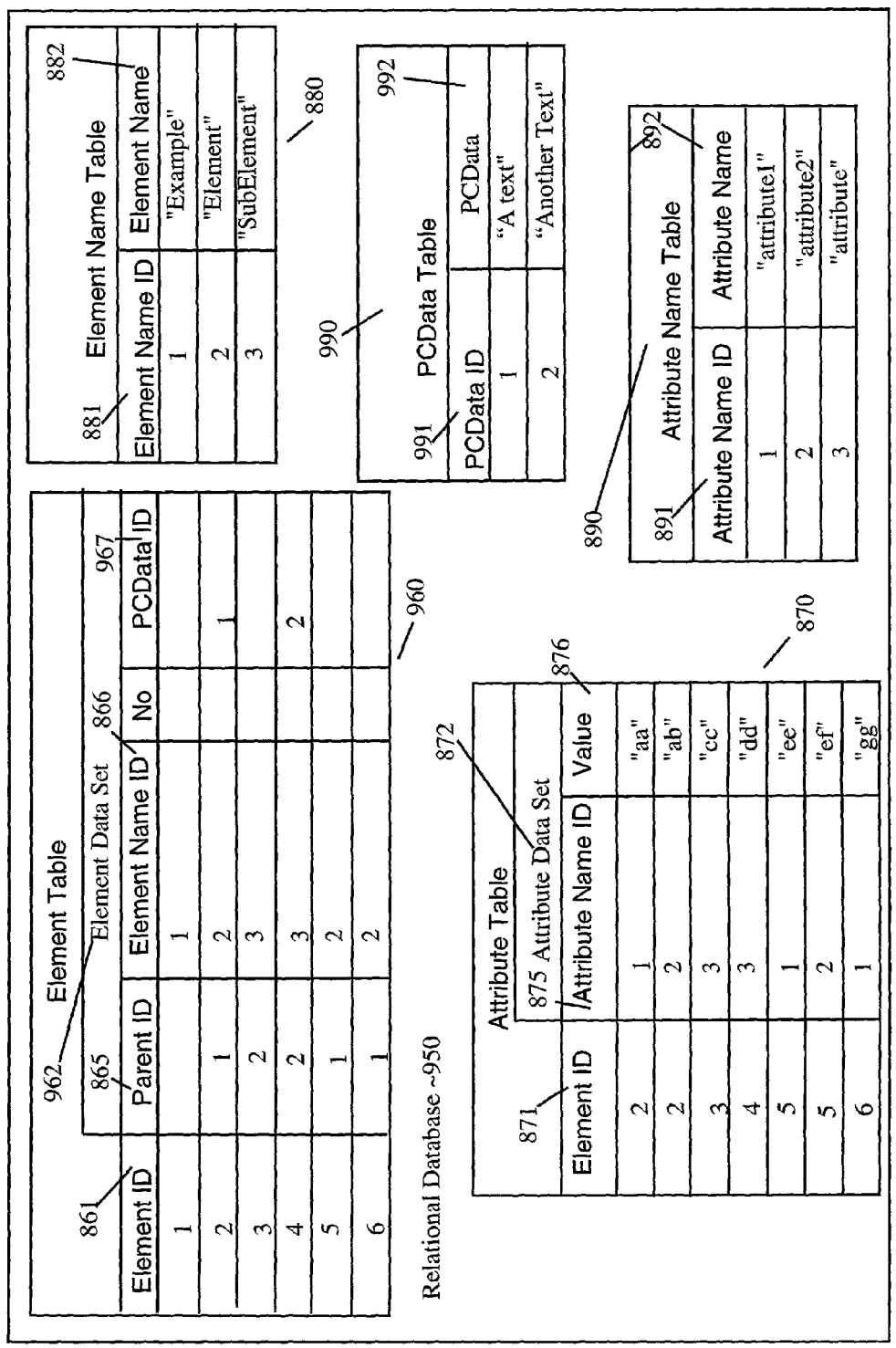
FIG. 9 is a diagram of a memory data structure, according to one embodiment of this invention, which includes a relational database including an element table, an element name table, an attribute table, an attribute name table, and a character data table for the XML-document of FIG. 6.

In view of the above disclosure, additional tables may be used to replace data in the element table, or the attribute table with a data ID. For example, in FIG. 9, relational database 950 is similar to relational database 850 except element data set 962 is defined differently. In this embodiment, character data field 867 (FIG. 8) is replaced with a character data ID field 967. If an element includes character data, character ID field 967 contains a unique character data ID that is a key into a character data table 990.

Character data table 990 includes a plurality of character data records, one for each unique character data. Each character data record in table 990 includes a unique character data ID in character data ID field 991, and corresponding character data in character data field 992. In this embodiment, since there are two unique sets of character data, table 990 includes two character data records, one for each unique character data set.

While embodiments of the present invention have been described for a client-server configuration, and a stand-alone configuration. The embodiment of the present invention may be carried out using any suitable hardware configuration involving a personal computer, a workstation, a portable device, or a network of computer devices.

Herein, a computer program product comprises a medium configured to store or transport computer readable code for method 300, method 500 or both or in which computer readable code for method 300, method 500, or both are stored. Some examples of computer program products are CD-ROM discs, ROM cards, floppy discs, magnetic tapes, computer hard drives, servers on a network and signals transmitted over a network representing computer readable program code.

As illustrated in FIGS. 1A and 1B, this storage medium may belong to the computer system itself. However, the storage medium also may be removed from the computer system. For example, module 130 may be stored in memory 184 that is physically located in a location different from processor 182. The only requirement is that processor 182 is coupled to the memory. This could be accomplished in a client-server system, or alternatively via a connection to another computer via modems and analog lines, or digital interfaces and a digital carrier line.

For example, memory 184 could be in a World Wide Web portal, while display unit 116 and processor 101 are in personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 100A, in one embodiment, can be a portable computer, a workstation, a two-way pager, a cellular telephone, a digital wireless telephone, a personal digital assistant, a server computer, an Internet appliance, or any other device that includes the components shown and that can execute method 300, method 500, or both, or that at least can provide the display capability and input responses described herein. Similarly, in another embodiment, computer system 100A can be comprised of multiple different computers, wireless devices, cellular telephones, digital telephones, two-way pagers, or personal digital assistants, server computers, or any desired combination of these devices that are interconnected to perform, the methods as described herein.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

In view of this disclosure, methods 300 and 500 can be implemented in a wide variety of computer system configurations. In addition, methods 300 and 500 could be stored as different modules in memories of different devices. For example, module 130 could initially be stored in a server computer 180, and then as necessary, a portion of module 130 could be transferred to a client device 100A and executed on client device 100A. Consequently, part of method 300 would be executed on the server processor 182, and another part of method 300 would be executed on processor 101 of client device 100A. In view of this disclosure, those of skill in the art can implement the invention of a wide-variety of physical hardware configurations using an operating system and computer programming language of interest to the user.

In yet another embodiment, module 130 is stored in memory 184 of system 180. Stored module 130 is transferred, over network 104 to memory 111 in system 100A. In this embodiment, network interface 183 and I/O interface 102 would include analog modems, digital modems, or a network interface card. If modems are used, network 104 includes a communications network, and module 130 is downloaded via the communications network.

Methods 300 and 500 may be implemented in a computer program including comprehensive office application STAROFFICE that is available from Sun Microsystems, Inc. of Palo Alto, Calif. (STAROFFICE is a trademark of Sun Microsystems.) Such a computer program may be stored on any common data carrier like, for example, a floppy disk or a compact disc (CD), as well as on any common computer system's storage facilities like hard disks. Therefore, an embodiment of the present invention also relates to a data carrier for storing a computer program for carrying out the inventive method. Another embodiment of the present invention relates to a method for using a computer system for carrying out the presented inventive method. Yet another embodiment of the present invention relates to a computer system with a storage medium on which a computer program for carrying out the presented inventive method is stored.

While the invention has been particularly shown with reference to an embodiment thereof, it will be understood by those skilled in the art that various other changes in the form and details may be made therein without departing from the spirit and scope of the invention.

We claim:

1. A method of storing data, from a markup document containing a plurality of elements and a plurality of attributes in a relational database, said method comprising:

storing an element record for every element of said plurality of elements in an element table of said relational database so that said relational database includes a plurality of element records, wherein each element record includes a unique element ID, and an element data set; and storing an attribute record for every attribute of said plurality of attributes in an attribute table of said relational database so that said relational database includes a plurality of attribute records, wherein said attribute record comprises an attribute data set for one attribute and an element ID of an element to which the one attribute is assigned wherein said element table and said attribute table include content of said markup document and further wherein a new markup document having a same content as said markup document can be constructed by retrieving said element data set in each of said plurality of element records stored in said element table of said relational database and by retrieving said attribute data set in each of said plurality of attribute records stored in said attribute table of said relational database.

2. The method of claim 1 wherein said element data set includes character data.

3. The method of claim 1 wherein said element data set contains a parent element ID.

4. The method of claim 2 wherein said element data set contains a parent element ID.

5. The method of claims 1 wherein said element data set includes an element name.

6. The method claim 1 further comprising:
storing, for every unique element name of the plurality of elements, an element name record including an element name and a corresponding unique element name ID in an element name table of said relational database.

7. The method of claim 1 comprising:
storing, for every unique attribute name of the plurality of attributes, an attribute name record including an attribute name and a corresponding unique attribute name ID in an attribute name table of said relational database.

8. The method of claim 1 wherein said attribute data set includes an attribute name.

9. The method of claim 1 wherein said attribute data set includes an attribute value.

10. The method of claim 8 wherein said attribute data set includes an attribute value.

11. The method of claim 1 wherein the markup document is an XML document.

12. A method of storing data, from a markup document containing a plurality of elements and a plurality of attributes, in a relational database, said method comprising:
storing an element record for every element of said plurality of elements in an element table of said relational database so that said relational database includes a plurality of element records, wherein each element record includes a unique element ID, and an element data set;
storing an attribute record for every attribute of said plurality of attributes in an attribute table of said relational database so that said relational database includes a plurality of attribute records, wherein said attribute record comprises an attribute data set for one attribute and an element ID of an element to which the one attribute is assigned;
storing, for every unique element name of the plurality of elements, an element name record including an element name and a corresponding unique element name ID in an element name table of said relational database; and
storing, for every unique attribute name of the plurality of attributes, an attribute name record including an attribute name and a corresponding unique attribute name ID in an attribute name table of said relational database wherein said element table and said attribute table include content of said markup document and further wherein a new markup document having a same content as said markup document can be constructed by retrieving said element data set in each of said plurality of element records stored in said element table of said relational database and by retrieving said attribute data set in each of said plurality of attribute records stored in said attribute table of said relational database.

13. The method of claim 12 wherein said element data set includes character data.

14. The method of claim 12 wherein said element data set contains a parent element ID.

15. The method of claim 14 wherein said element data set contains a parent element ID.

16. A memory data structure comprising:
an element table wherein said element table is configured to store a plurality of element records corresponding to a plurality of elements of a markup document so that a relational database includes a plurality of element records, and further wherein each element record includes an assigned element ID field and an element data set field; and
an attribute table wherein said attribute table is configured to store a plurality of attribute records corresponding to a plurality of attributes of said markup document so that said relational database includes a plurality of attribute records, and further wherein each attribute data record includes an element ID field and an attribute data set wherein said element table and said attribute table include content of said markup document and further wherein a new markup document having a same content as said markup document can be constructed by retrieving said element data set in each of said plurality of element records stored in said element table of said relational database and by retrieving said attribute data set in each of said plurality of attribute records stored in said attribute table of said relational database.

17. The data structure of claim 16 wherein the element data set includes a character data field.

18. The data structure of claim 16 wherein the element data set includes a parent element ID field.

19. The data structure of claims 16 wherein the element data set includes an element number field.

20. The data structure of claim 17 wherein said element data set includes an element name field.

21. The data structure of claims 16 wherein the element data set comprises an element name ID field.

22. The data structure of claim 21 further comprising:
an element name table wherein said element name table is configured to store a plurality of element name records, and further wherein each element name record includes an element name ID field and a corresponding element name field.

23. The data structure of claim 16 wherein said attribute data set includes an attribute name and an attribute value.

24. The data structure of claim 16 wherein said attribute data set contains an attribute name ID.

25. The data structure of claim 24 further comprising:
an attribute name table wherein said attribute name table is configured to store a plurality of attribute name records wherein each attribute name record includes an attribute name ID field and a corresponding attribute name field.

26. A computer program product having stored thereon a module for transferring data from a markup document into a relational database wherein execution of said module generates a method comprising:
storing an element record for every element of a plurality of elements of said markup document in an element table of said relational database so that said relational database includes a plurality of element records, wherein each element record includes a unique element ID, and an element data set; and storing an attribute record for every attribute of a plurality of attributes of said markup document in an attribute table of said relational database so that said relational database includes a plurality of attribute records, wherein said attribute record comprises an attribute data set for one attribute and an element ID of an element to which the one attribute is assigned wherein said element table and said attribute table include content of said markup document and further wherein a new markup document having a same content as said markup document can be constructed by retrieving said element data set in each of said plurality of element records stored in said element table of said relational database and by retrieving said attribute data set in each of said plurality of attribute records stored in said attribute table of said relational database.

27. The computer program product of claim 26 wherein said method further comprises:

storing, for every unique element name of the plurality of elements, an element name record including an element name and a corresponding unique element name ID in an element name table of said relational database.

28. The computer program product of claim 26 wherein said method further comprises:

storing, for every unique attribute name of the plurality of attributes, an attribute name record including an attribute name and a corresponding unique attribute name ID in an attribute name table of said relational database.

29. The computer program product of claim 27 wherein said method further comprises:

storing, for every unique attribute name of the plurality of attributes, an attribute name record including an attribute name and a corresponding unique attribute name ID in an attribute name table of said relational database.

30. A computer system comprising:

a memory having stored therein a module for transferring data from a markup document into a relational database;

a processor coupled to said memory wherein execution of said module by said processor generates a method comprising:

storing an element record for every element of a plurality of elements of said markup document in an element table of said relational database so that said relational database includes a plurality of element records, wherein each element record includes a unique element ID, and an element data set; and storing an attribute record for every attribute of a plurality of attributes of said markup document in an attribute table of said relational database so that said relational database includes a plurality of attribute records, wherein said attribute record comprises an attribute data set for one attribute and an element ID of an element to which the one attribute is assigned wherein said element table and said attribute table include content of said markup document and further wherein a new markup document having a same content as said markup document can be constructed by retrieving said element data set in each of said plurality of element records stored in said element table of said relational database and by retrieving said attribute data set in each of said plurality of attribute records stored in said attribute table of said relational database.

31. The computer system of claim 30 wherein said method further comprises:

storing, for every unique element name of the plurality of elements, an element name record including an element name and a corresponding unique element name ID in an element name table of said relational database.

32. The computer system of claim 30 wherein said method further comprises:

storing, for every unique attribute name of the plurality of attributes, an attribute name record including an attribute name and a corresponding unique attribute name ID in an attribute name table of said relational database.

33. The computer system of claim 31 wherein said method further comprises:

storing, for every unique attribute name of the plurality of attributes, an attribute name record including an attribute name and a corresponding unique attribute name ID in an attribute name table of said relational database.

* * * * *